April 12, 1932.  J. ROBINSON  1,854,066
WIRELESS SIGNALING SYSTEM
Filed Sept. 12, 1929

INVENTOR
James Robinson
By Watson, Coit, Morse & Grindle
Attys

Patented Apr. 12, 1932

1,854,066

UNITED STATES PATENT OFFICE

JAMES ROBINSON, OF LONDON, ENGLAND, ASSIGNOR, BY MESNE ASSIGNMENTS, TO BRITISH RADIOSTAT CORPORATION, LIMITED, A CORPORATION OF CANADA

WIRELESS SIGNALING SYSTEM

Application filed September 12, 1929, Serial No. 392,148, and in Great Britain September 26, 1928.

This invention is for improvements in or relating to direction-finding wireless communication systems. In direction-finding systems it is valuable to provide at the receiving station a visual indication of the bearing, but in such systems as heretofore used the accuracy of the received signal has been liable to vitiation by interference; the bearing which it is desired to know was indicated by the movement of an instrument of the galvanometer type, and any interfering signal by exerting an additive or subtractive effect on the transmitted signals produced a corresponding deflection from the true bearing which should have been indicated.

It is an object of the present invention to provide a system of signaling with visual reception in which interference does not produce any error in the information which is being transmitted, that is to say, does not cause an incorrect reading of the bearing to be given.

Elimination of interference in receiving apparatus has been effected by using cathode ray oscillographs generally for the purpose of selecting a given signal from a number of interfering impulses. They have also been employed in combination with directional aerials for radio telegraphic direction-finding and similar purposes. In one arrangement it has hitherto been proposed to include a cathode ray oscillograph in a chain of receiving circuits in such manner that the control of further links in the receiving chain is effected by means of the quasi-stationary pattern produced by the combination of the electromotive force from the required signal, and another locally controlled E. M. F. and a selecting template with a correspondingly shaped aperture. Such an arrangement, however, is not suitable for directional reception as generally understood, since the selection effected by the oscillograph was operative by virtue of the wave form of the received signal, as distinct from its direction of reception.

The present invention comprises a direction-finding wireless communication system wherein the received energy is in the form of a substantially continuous succession of signals and wherein means are employed for producing a visual indication of the continuous series whereby an interference signal can be recognized as a departure from the symmetry of the indication.

By the expression "succession of signals" used above and in the following claims, is meant a succession of signals each consisting of a train of wireless waves.

The present invention also comprises a direction-finding wireless communication system wherein the transmission includes a succession of television or still picture signals and either the means for transmitting, or the means for receiving, has directional effects.

According to another feature of the invention when employing still pictures the means for transmitting or the means for receiving is in the form of a rotating loop or other directional device and the speed of rotation is the same as or some definite multiple or sub-multiple of the speed of repetition of the picture.

This invention also comprises in a wireless direction-finding system, the combination with a rotating directional wireless transmitter at one station, of a pointer which rotates synchronously with such transmitter, and television apparatus for transmitting an image of the rotating pointer from the directional transmitter aforesaid. The picture of the rotating pointer which is transmitted may have a predetermined orientation, such for example that when the pointer is pointing north, it is exhibited as pointing to the top of the reproduced image, so that the observer can read a bearing on the image. Alternatively, a special orientating signal may be transmitted at some selected point in the rotation of the pointer, so that this point may be noted by the observer of the image.

Preferably the pointer is aligned with the most readily distinguishable directional signal of the transmitter so that the received image of the rotating pointer gives a direct reading of the required bearing.

Several embodiments of this invention will now be described by way of example with reference to the accompanying drawings, but it will be understood that the invention is not limited to these particular examples. In the drawings diagrammatically illustrating systems according to the invention—

In the following description for simplicity, the directional devices, whether for transmitting or receiving, will be referred to as a loop aerial, but it will be appreciated that any directional device, including rotating beams, may be used. Further, for simplicity in description, the transmitting and receiving stations will be referred to as the shore station and ship respectively, the information that it is desired to know being the bearing of the ship with respect to the shore station, but it will be understood that the invention may be applied in any desired circumstances.

Figure 1:
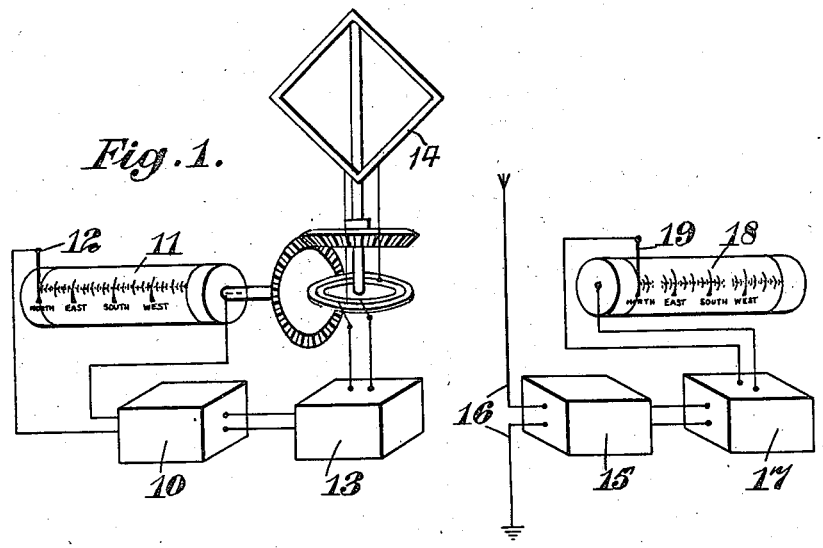
Figure 1 shows a direction-finding system employing still picture transmission.

Referring to the system represented in Figure 1, the shore station is equipped with an apparatus 10 for transmitting still pictures, and having a rotatable drum 11 upon which a picture for transmission is mounted and a co-operating stylus 12. The picture may embody the name of the shore station, a suitable scale and any other information of identification which may be desirable to include. As shown in the drawings, the picture includes a scale of 360° extending the complete width of the picture and a rotation of the corresponding compass points. The picture signals are employed to modulate the output of a wireless transmitting apparatus 13 having a rotating loop aerial 14. The loop aerial 14 is coupled for rotation with the drum 12 in such a manner that the former is turned through a complete revolution of 360° during the transmission of one complete picture. For instance, the drum 11 may be carried on shaft 42 which is in turn geared to the support 44 for the loop 14 by means of the bevel gearing 45, the shaft 42 being rotatable manually if desired by means of the crank 46. The ship is equipped with a wireless receiving apparatus 15 having a non-directional aerial system 16 and a picture-receiving apparatus 17 including a rotatable drum 18 and co-operating stylus 19. If it be arranged that the picture starts when the loop is facing in a certain direction, say north, the ship will receive an image of which a part is missing, namely, that part of the picture which is being transmitted whilst the loop is facing the ship. The position of this blank portion of the image will indicate to the observer the angular bearing of ship from the shore station. In the drawings, blank portions are shown at NE and at SW indicating that the ship is either north-east or south-west of the shore station because a simple loop aerial gives a bi-directional effect. By using a transmitter having a beam or unidirectional radiation an indication only of the true direction is obtained.

Alternatively, the shore station may transmit the picture aforesaid on an open or non-directional wireless transmitter, and the ship may be provided with a loop receiver which may have sense effect in order to obtain a unidirectional indication. The resultant image presented to the observer is similar to that already described, so that he again can obtain a reading of the ship's bearing.

In both these instances the picture which is transmitted may be provided with a scale graduated from 0 to 180° instead of 0 to 360° (or in fact any other convenient scale according to the relative rates of rotation) these scales being arranged on a straight line. Alternatively, if the picture which is being transmitted be explored by a circular or helical exploring movement (e. g. by employing disc instead of the drum 11) a circular scale may be used and a circular image will be received on the ship (e. g. on a disc used in place of the drum 18). The missing part of the picture will be in the form of a sector, so that the reading of the angle of the bearing will be facilitated.

Any suitable method of picture transmission may be employed. In the drawings there is shown a stylus 12 which may traverse a picture on the drum 11 formed in insulating material on a conducting base (or vice versa) and a stylus 19 at the receiver which may conduct the current to trace the picture upon electrolytically sensitized paper on the drum 18.

Alternatively, a photoelectric method may be used.

Instead of still picture apparatus television apparatus may be used for more rapid transmissions; thus, for example, if the loop be rotated say sixteen times per second, and a succession of pictures be transmitted, each in one-sixteenth of a second, a similar effect will be obtained, namely, that an enduring picture would be presented to the observer, but a portion or sector of it will be missing, the position of the missing portion giving the desired bearing. Should the loop and television apparatus not be exactly synchronized, the effect would be that there would not be a complete blank in a portion of the image; but it will in general be desirable to couple the television apparatus by mechanical gearing to the loop, so that the desired relation of speeds between the two is always obtained.

In the transmission of pictures by the still picture method or by television, the picture is constituted by a succession of bands extending side by side across the picture, and if the rotation of the loop is such that it rotates once for the transmission of each band the received picture will be a line or lines across the picture, these lines indicating the bearing by relation of their position with the edges of the picture or other datum line.

Figure 2:
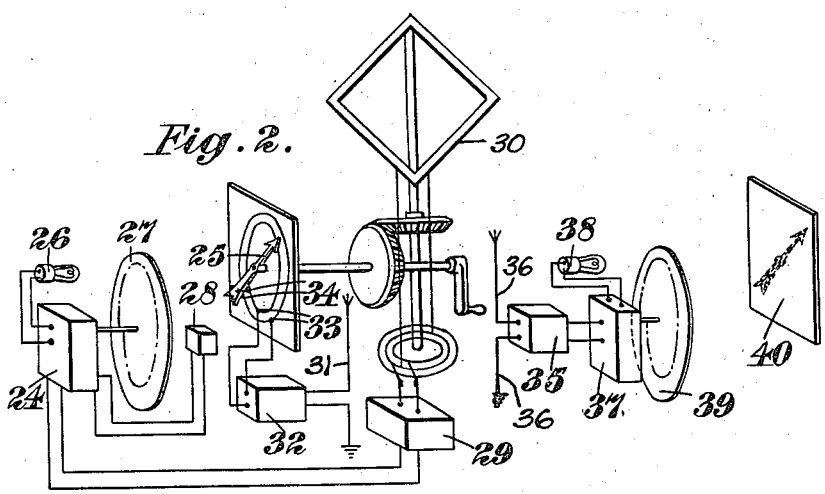
Figure 2 shows a direction-finding system employing television.

Referring to the system shown in Figure 2, there is provided at the shore station a pointer 25 which rotates at a predetermined speed, say one revolution per minute. By means of television apparatus 24 having a source of light 26, a rotating scanning disc 27, and a light sensitive device 28, a picture of the rotating pointer is transmitted by a wireless transmitter 29 having a rotatable loop aerial 30. The loop aerial 30 is coupled with the pointer 25 to rotate synchronously therewith, the pointer being arranged to lie normal to the plane of the loop. At the ship station there is a wireless receiver 35 having a non-directional aerial 36 and coupled to a television receiving apparatus 37 having a source of light 38, a rotatable distributing disc 39, which is rotated in synchronism with the disc 27 at the transmitter, and a screen 40. Conventional driving means for effecting rotation of the pointer 25 and loop 30 similar to that shown in Figure 1 of the drawings may be employed. Also at the shore station there is means for transmitting an orientating signal (at a predetermined angular position of the pointer and transmitting aerial) comprising a non-direction aerial 31 and a transmitting apparatus 32 which is controlled by means of switch contacts 33 short circuited by brushes 34 on the pointer 25. Thus in operation a moving picture of a rotating pointer appears on the screen 40 and the image of the pointer will vanish over two diametrically opposite sectors. The screen 40 may be graduated as a compass card and is orientated according to the received signal and then the vanishing points will give a direct indication of the bearing of the ship from the station. By employing instead of the loop a beam transmitter or the equivalent (in which case the pointer 25 is arranged to point in the direction of the beam) a picture of the pointer appears over one sector, thus giving a unidirectional bearing. It is not essential in using a rotating loop at the shore station, that the pointer should be normal to the plane of the loop; it may for example be parallel to or in the plane of the loop in which case the sector or sectors in which the picture of the pointer will give a reading of the bearing. The orientating signal may be dispensed with and in this case the rotating pointer is arranged to have a predetermined orientation, e. g. it is arranged to be pointing north when pointing to the top of the picture.

In an alternative arrangement the loop 30 and transmitter 29 are dispensed with and the transmission of the picture of the rotating pointer and the orientating signal is carried out by the transmitter 32 and non-directional aerial 31. In this case a continuous picture of the pointer is received upon the screen 40 and the observer can mark the point in its rotation at the instant he receives the orientating signal, this being a compass bearing. By employing a loop aerial instead of the non-directional aerial 36 at the ship station the bearing upon the shore station can also be obtained.

Figure 3:
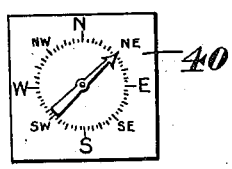
Figure 3 shows a detail.

In another modification the shore station may transmit a picture of a correctly orientated compass card over which a rotating pointer is mounted. Thus in an arrangement similar to that shown in Figure 2 a picture of the compass card is transmitted on the open or non-directional transmitter 32 instead of the orientating signal, so that the observer receives a complete picture of the compass card upon the screen 40, and also the picture of the rotating pointer that is transmitted on a rotating loop 30. These pictures are superposed upon the screen, so that as shown in Figure 3 the observer can see the pointer rotating over a compass card and vanishing over a sector or opposite sectors during its rotation to give the desired bearing.

In a very simple embodiment of this invention the shore station may transmit on a non-directional aerial, a picture which identifies that station, and it is received on a loop aerial on the ship. By adjustment of the loop the picture (if transmitted by television) or a portion of it (if transmitted by phototelegraphy) is caused to disappear, and the desired bearing is given by the angular position of the loop.

Where in the arrangements described above it is necessary to synchronize the picture transmitter with the picture receiver, any suitable means may be provided for this purpose. For example in arrangements employing still pictures the transmitting drum may be rotated continuously and the receiving drum may be rotated slightly fast and stopped at the completion of each revolution to be started again upon receipt of a synchronizing signal from the transmitter.

In all cases where directional devices are used they may be either 180° or 360° devices, that is to say, the sense as well as the angle of the bearing may be obtained if desired.

I claim:

1. A wireless direction-finding system comprising a transmitting station and a receiving station, one of said stations being effective in different degree in different directions, means for shifting the directional effectiveness of said station, picture signalling means at the transmitting station for the transmission of a picture signal series and means for correlating the rate at which the picture is transmitted with the rate at which the directional effectiveness of said station is shifted.

2. A wireless direction-finding system comprising a transmitting station and a receiving station, one of said stations being effective in different degree in different directions, means for shifting the directional effectiveness of said station, picture telegraph apparatus at the transmitter for the transmission of a still picture, and means correlating the rate at which the picture is transmitted with the rate at which the directional effectiveness of said station is shifted.

3. A wireless direction-finding system comprising a transmitting station and a receiving station, one of said stations being effective in different degree in different directions, means for shifting the directional effectiveness of said station, television apparatus at the transmitter for the transmission of a moving picture, and means correlating the speed of repetition of a picture that is transmitted with the rate at which the directional effectiveness of said station is shifted.

4. A wireless direction-finding system comprising a wireless transmitter, a rotatable directional aerial for said transmitter, and picture signaling means for the transmission of a picture signal series, said picture signaling means being coupled with the said aerial whereby the latter is rotated at a speed which is the same as the speed of reception of the picture.

5. A wireless direction-finding system comprising a wireless transmitter, a rotatable directional aerial for said transmitter, means at the transmitter for transmitting a picture comprising a plurality of signal series and means for correlating the rate of transmission of the picture with the rotation of said aerial for the transmission of one signal series for each revolution of the said aerial.

6. Directional wireless apparatus comprising the combination of a wireless transmitter, a rotatable directional aerial for said transmitter, a picture telegraph device coupled to said transmitter and to said aerial whereby a picture that is transmitted by the said wireless transmitter is correlated with rotation of the said aerial.

7. Directional wireless apparatus comprising the combination of a wireless transmitter effective in different degree in different directions, means for shifting the directional effectiveness of said transmitter, a pointer rotatable in timed relation with the operation of said means, and a television apparatus for transmitting an image of the rotating pointer from the wireless transmitter.

8. Directional wireless apparatus comprising the combination of a wireless transmitter, a rotatable directional aerial for said transmitter, a pointer rotatable synchronously with the said aerial and a television apparatus for transmitting an image of the rotating pointer from the wireless transmitter, said pointer having a predetermined orientation with respect to the rotating aerial.

9. Directional wireless apparatus comprising the combination of a wireless transmitter effective in different degree in different directions, means for shifting the directional effectiveness of said transmitter, a pointer rotatable in timed relation with the operation of said means, a television apparatus for transmitting an image of the rotating pointer from the wireless transmitter, and means for transmitting an orientating signal at a selected point in the rotation of the pointer whereby this point can be correlated with the position of the pointer in the image that is received.

10. Directional wireless apparatus comprising the combination of a wireless transmitter, a rotatable directional aerial for said transmitter, a pointer which is rotated synchronously with the said aerial, a fixed chart over which the said pointer rotates, a television apparatus for transmitting an image of the rotating pointer from the wireless transmitter, and means for transmitting a picture of the said chart.

11. Directional wireless apparatus comprising the combination of a wireless transmitter, a rotatable directional aerial for said transmitter, a pointer which is rotated synchronously with the said aerial and a television apparatus for transmitting an image of the rotating pointer from the wireless transmitter, said television transmission including a readily distinguishable signal whereby the image of the pointer produced at the receiver may be properly orientated with respect to said distinguishable signal.

12. A wireless direction-finding system comprising a transmitting station and a receiving station, one of said stations being effective in different degree in different directions, means for causing a shifting of the directional effectiveness of said last named station, and means at said transmitting station for transmitting a signal varying in character to correspond to different directions, said last named means operating in synchronism with said first named means.

13. A wireless direction-finding system comprising a transmitting station and a receiving station, said receiving station being effective in different degree in different directions, means for shifting the directional effectiveness of said station, picture signaling means at the transmitting station for the transmission of a picture signal series and means for correlating the rate at which the picture is transmitted with the rate at which the directional effectiveness of said receiving station is shifted.

14. A wireless direction-finding system comprising a transmitting station and a receiving station, said receiving station being effective in different degree in different directions, means for shifting the directional effectiveness of said station, picture telegraph apparatus at the transmitter for the transmission of a still picture, and means correlating the rate at which the picture is transmitted with the rate at which the directional effectiveness of said receiving station is shifted.

15. A wireless direction-finding system comprising a transmitting station and a receiving station, said receiving station being effective in different degree in different directions, means for shifting the directional effectiveness of said station, television apparatus at the transmitter for the transmission of a moving picture, and means correlating the speed of repetition of a picture that is transmitted with the rate at which the directional effectiveness of said receiving station is shifted.

In testimony whereof I affix my signature.

JAMES ROBINSON.